Patented Mar. 27, 1923.

1,449,681

UNITED STATES PATENT OFFICE.

ERWIN KRAMER, OF DENTZ, NEAR COLOGNE, AND LUDWIG ZEH, OF WIESDORF, NEAR COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

SULPHUR DYE.

No Drawing. Application filed April 17, 1922. Serial No. 553,977.

*To all whom it may concern:*

Be it known that we, ERWIN KRAMER and LUDWIG ZEH, citizens of Germany, residing at Dentz, near Cologne, and Wiesdorf, near Cologne-on-the-Rhine, Prussia, Germany, have invented new and useful Improvements in Sulphur Dyes, of which the following is a specification.

Our invention relates to the manufacture of new blue sulphur colors which are obtained by treating with alkali polysulfides the indophenols of the formula:

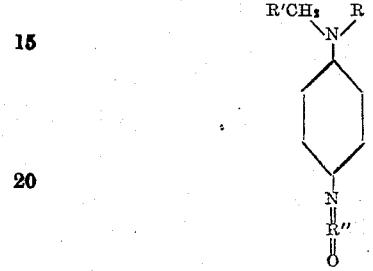

(in which formula R means an alkyl such as $-CH_3$; $-C_2H_5$; $-C_3H_7$ etc., R' an aryl such as phenyl, tolyl, etc., and R'' a mononuclear arylen such as $-C_6H_4=$; $C_6H_2Cl_2=$ etc.) or the corresponding leucoindophenols.

The new dyes are after being dried and pulverized dark blue powders soluble in concentrated sulfuric acid generally with a bluish coloration. They dye cotton from a hydrosulfite vat or from a bath containing sodium sulfide pure blue shades fast to boiling, to chlorin and to light. They can also be used in printing according to the methods known for printing vat dyes.

In order to illustrate the new process more fully the following example is given, the parts being by weight:—

In a vessel provided with a reflux condenser the indophenol of the formula:

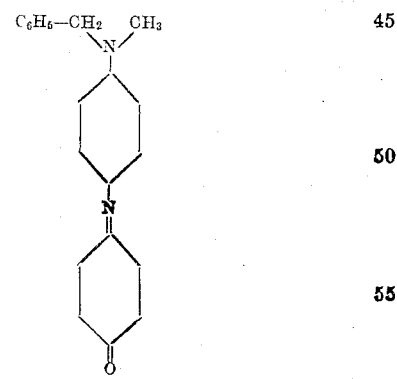

(obtained from 28,6 parts of methylbenzyl anilin and 20,5 parts of quinone chlorimide) is boiled for 60 hours in an alcoholic solution together with a polysulfide prepared from 80 parts of technical calcined sodium sulfide and 100 parts of pulverized sulphur. The alcohol is then distilled off, the residue is treated with water, filtered off and washed with water.

Our new dyestuff is after being dried and pulverized a dark blue powder. It is soluble in concentrated sulfuric acid with a pure blue coloration. It dyes cotton from a yellow hydrosulfite vat a pure greenish-blue shade fast to boiling, chlorin and light.

A similar dye is produced from the indophenol obtainable from methylbenzylanilin and 4-amino-2.6-dichlorophenol.

We claim:—

1. The herein described new sulphur dyes obtained from indophenols of the formula:

$$\underset{R''}{\underset{\parallel}{N}}\text{—}\bigcirc\text{—}\underset{\underset{R}{\overset{R'CH_2}{\diagdown N \diagup}}}{}$$

(in which R means an alkyl radical, R' means an aryl radical and R'' means a mononuclear arylen); which are after being dried and pulverized dark blue powders, being soluble in concentrated sulfuric acid generally with a bluish coloration; and dyeing unmordanted cotton blue shades fast to light, to chlorin and to boiling, substantially as described.

2. The herein described new sulphur dye obtained from the indophenol of the formula:

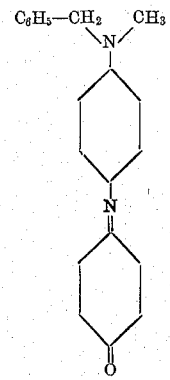

which dye is after being dried and pulverized a dark blue powder soluble in concentrated sulfuric acid with a pure blue coloration; and dyeing unmordanted cotton from a hydrosulfite vat in greenish-blue shades fast to light, to chlorin and to boiling, substantially as described.

In testimony whereof we have hereunto set our hands in the presence of two subscribing witnesses.

ERWIN KRAMER.
LUDWIG ZEH.

Witnesses:
HEINZ W. HAAS,
ERIC L. ROOXLING.